Sept. 25, 1962  W. P. KINNEMAN, JR  3,055,278
REINFORCED PLASTIC PIPE
Filed Aug. 6, 1958  2 Sheets-Sheet 1

INVENTOR
WILLIAM P. KINNEMAN, JR
BY
*John A. McKinney*
ATTORNEY

Sept. 25, 1962  W. P. KINNEMAN, JR  3,055,278
REINFORCED PLASTIC PIPE

Filed Aug. 6, 1958  2 Sheets-Sheet 2

INVENTOR
WILLIAM P. KINNEMAN, JR
BY
*John A. McKinney*
ATTORNEY

United States Patent Office 3,055,278
Patented Sept. 25, 1962

3,055,278
REINFORCED PLASTIC PIPE
William Paul Kinneman, Jr., Somerville, N.J., assignor to Johns-Manville Corporation, New York, N.Y., a corporation of New York
Filed Aug. 6, 1958, Ser. No. 753,518
4 Claims. (Cl. 93—94)

This invention relates to hollow tubular articles and a method for making such articles. In particular, the invention is directed to hollow tubular articles, such as reinforced plastic pipe, produced from resin impregnated fibrous sheet materials such as paper, cloth, felt or the like. While the principles of the invention will be explained in relation to such pipe, it is to be understood that these principles are equally applicable to the production of other hollow tubular articles.

At the present time, industry is seeking a satisfactory method for fabricating reinforced plastic pipe. The most direct and simple method of fabricating reinforced plastic pipe is to wind a sheet of resin impregnated paper on a mandrel under pressure so that the fibers in the paper are oriented circumferentially in the reinforced pipe to give the maximum burst strength. However, this method limits the length of the pipe to the width of the paper. To overcome this defect, one system employs spirally or helically wound tapes in which one or a plurality of continuous tapes are wound spirally or helically around a mandrel in many overlapping and crossing joints. These tapes are impregnated with various materials during any desired phase of the fabrication. However, all of these latter methods are extremely time consuming, involve the use of relatively narrow tapes and require the use of complicated and expensive wrapping mechanisms.

It is an object of this invention to provide a hollow tubular article, such as a reinforced plastic pipe, and the method of producing such pipe in which the length of the finished pipe is substantially greater than the width of the sheet of resin impregnated paper or the like from which it is formed and which pipe has a predetermined number of spaced joints less than the number of sheets of material.

It is a further object of this invention to provide a hollow tubular article, such as a reinforced plastic pipe, and the method of producing such article in which a plurality of sheets of material are wrapped around a mandrel to form a hollow tubular article having a predetermined number of spaced spiral joints less than the number of sheets of material.

The foregoing objects are accomplished in accordance with the instant invention by arranging a plurality of continuous sheets of impregnated paper so that the adjacent edges of the sheets of paper abut in contiguous relationship. A rotatable cylindrical mandrel is positioned to receive the sheets of paper so that each sheet of paper is wrapped around the mandrel as it is rotating to form a hollow article of many convolutions. The paper is fed to the mandrel so that the longitudinal axis and the free edges of each sheet are at least substantially equally offset ½ to 10 degrees from a line perpendicular to the longitudinal axis of the mandrel to form an acute angle therewith. The term "longitudinal axis" used herein relates to that axis of the sheet which describes a spiral path around the longitudinal axis of the finished pipe. As the sheets of paper are wrapped around the mandrel, the contiguous edges of the sheets of paper are wound in a spiral joint. After a predetermined wall thickness has been formed by the convolutions on the mandrel, the sheets of paper are severed and the mandrel with the reinforced plastic pipe formed thereon is removed from the machine and placed in an oven for curing. The reinforced plastic pipe thus formed has a predetermined number of spaced spiral joints, less than the number of sheets of impregnated paper, in its oval length.

The invention will be more fully understood and further objects and advantages thereof will become apparent when reference is made to the following detailed description of a preferred embodiment of the invention and the accompanying drawings in which.

Figure 1:
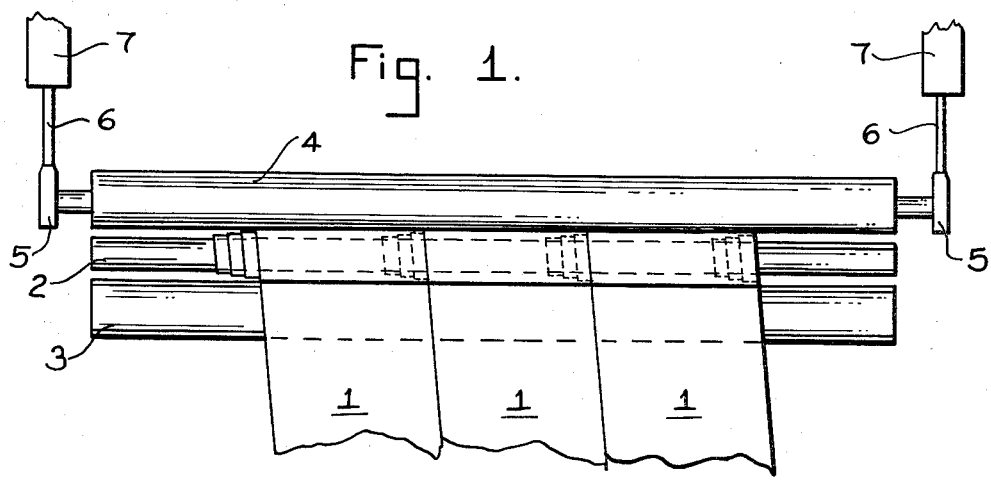
FIG. 1 is a schematic representation of apparatus for performing the process of the instant invention.

Referring to the drawing, there is disclosed schematically, in FIG. 1, apparatus for forming a plurality of continuous sheets 1 of resin impregnated sheet material exemplified by paper into a reinforced plastic pipe in accordance with the instant invention. As viewed in FIG. 1, a mandrel 2 is positioned between a pair of lower rollers 3 and a pressure cylinder or roller 4. Each of the rollers 3 is connected by conventional mechanisms (not shown) to a source of power for rotation thereof. The pressure roller 4 is journalled for rotation in bearings 5 which are secured to the vertically movable piston rods 6 which are hydraulically positioned by conventional mechanism within the housings 7. The mechanism in the housing 7 provides for the exertion of a predetermined pressure by the pressure roller 4 on the papers 1 wound about the mandrel 2. All of the rollers, other than the pair of rollers 3, driven as stated above, are frictionally rotated through the driven rollers 3. The pressure roller 4 cooperates with the lower rollers 3 in the compressing of the continuous sheets 1 of paper as these sheets are wrapped around the mandrel 2 into a reinforced plastic pipe.

Figure 2:
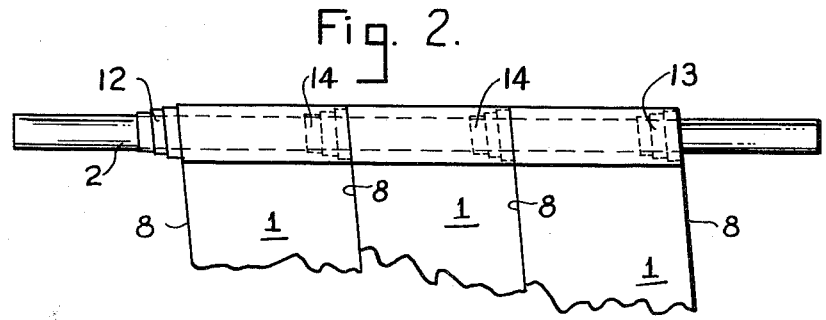
FIG. 2 is a top view of the apparatus of FIG. 1 with parts removed.
Figure 3:
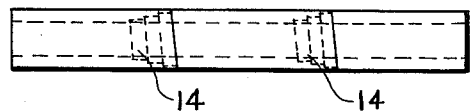
FIG. 3 is a side elevation showing a finished pipe.

As viewed in FIG. 2, each continuous sheet 1 has free edges 8 which are substantially parallel to the longitudinal axis of the sheet. Each continuous sheet 1 is fed to the mandrel 2 so that the longitudinal axis of the sheet 1 and, therefore, the free edges 8 are offset at least substantially equally, and, for each edge, at least substantially equally to the offset of the contiguous edge of the adjacent sheet, an amount within the approximate range of ½ to 10 degrees from a plane perpendicular to the longitudinal axis of the mandrel 2. The continuous sheets 1, composed of a resin impregnated fibrous material such as paper, cloth, felt or the like wherein the fibers are generally parallel to the longitudinal axis of the sheet, are fed from rolls 9 (FIGS. 4 and 5), in each of which the longitudinal axis and the free edges 8 of the sheets lie in planes substantially perpendicular to the longitudinal axis of the roll. These rolls 9 are mounted on a positioner 10, illustrated in FIGS. 4 and 5 and explained below, which is mounted on a short track 11 for movement thereover. Conventional mechanisms on the positioner 10 enable the positioner to maintain an even tension on the paper during the advances of the positioner 10 along the track 11. The rolls 9 are journalled for rotation in bearings fixed to the positioner 10 so that the longitudinal axes of the rolls 9, if extended, would form an acute angle of ½ to 10 degrees with the longitudinal axis of the mandrel 3. The continuous sheets 1 from the rolls 9 are positioned so that the adjacent edges 8 of the continuous sheets 1 abut in contiguous relationship. Thus, as the sheets 1 are wound about the mandrel 2, the adjacent contiguous edges 8 describe a spiral path. One edge 8 of each sheet, in describing this spiral path, defines an externally tapered male or spigot end, such as illustrated at 12 in FIG. 2. The other edge 8 of each sheet, in describing such spiral path, defines an internally tapered female or socket end, such as illustrated at 13 in FIG. 2. Such tapered ends 12 and 13, formed by contiguous edges of adjacent sheets, mate with each other to form a spiral joint 14 having a composite or total wall thickness at any one point equal or substantially equal to that of the pipe between joints. Moreover, as will be clear from FIGS. 2 and 3, the adjacent edges 8 form a spiral joint between the adjacent sheets 1 wherein any one point of the joint is reinforced by several layers of laminated paper. The joint thus formed is extremely strong and functions to hold the adjacent sheets in position to provide a continuous length of reinforced plastic pipe. The free ends 12 and 13 of the reinforced plastic pipe are then removed leaving a finished product having a uniformly smooth inner and outer surface. The spiral joints 14 holding the adjacent sheets of paper in the finished pipe, are evidenced by only a smooth spiral line on the inner and outer surfaces of the pipe.

Figure 4:
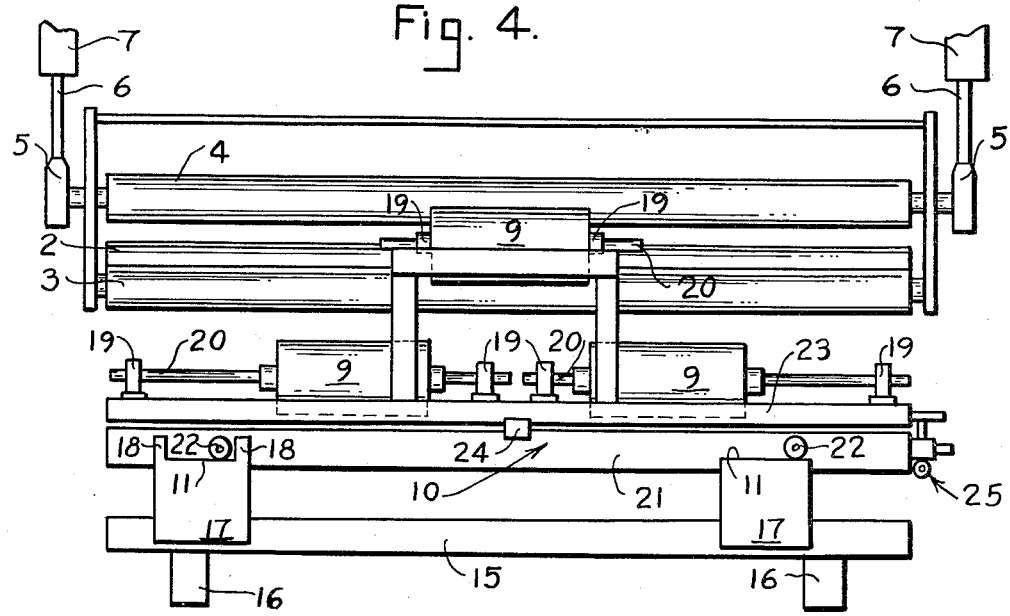
FIG. 4 is a front elevation of pipe forming apparatus.
Figure 5:
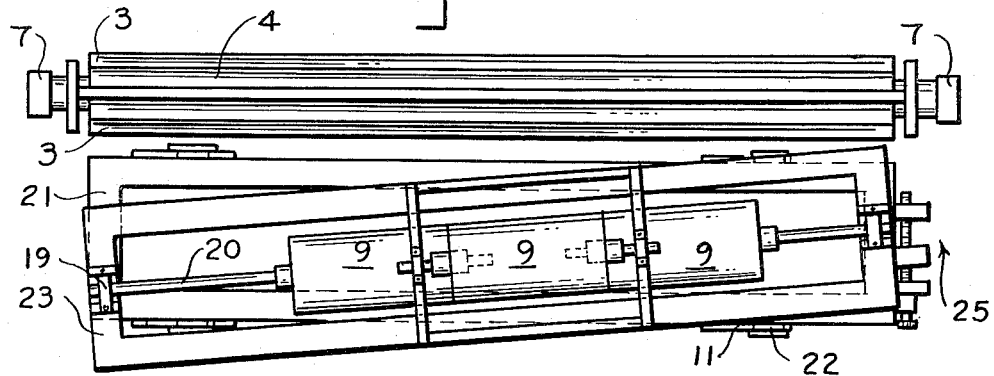
FIG. 5 is a top plan view of the apparatus of FIG. 4.

The apparatus for carrying out the process for forming a reinforced plastic pipe in accordance with this invention is best illustrated in FIGS. 4 and 5. A positioner 10 is adapted to hold the rolls 9 of the sheets 1 of the plastic paper. A stationary base 15 is supported on legs 16 and is positioned so that the longitudinal axis of base 15 is parallel to the longitudinal axis of the mandrel 2, which is supported by the rollers 3, on which it rests. A plurality of upstanding brackets 17 are secured to the base with the upper surface of each bracket constituting a section of a track 11. One of the brackets 17 has a pair of upstanding lugs 18 which serve as stop members limiting the travel of the positioner over the tracks. The positioner 10 has a plurality of tension bearings 19 fixed thereto in which are journalled the rods 20 supporting the rolls 9 of the continuous sheets 1. The positioner 10 consists of a lower section 21 having a plurality of wheels 22, conventionally mounted in the lower section 21, and supporting the positioner 10 for reciprocal longitudinal movement along the tracks 11. An upper section 23 of the positioner 10 is pivotally mounted by the pivot pin 24 on the lower section 21. A conventional worm mechanism 25 is adapted to position the upper section 23 relative to the lower section 21 so that the upper section 23 and therefore the rolls 9 are set at the desired angle to the mandrel 2. As illustrated in FIG. 5, the upper section 23 is positioned so that its longitudinal axis if extended would form an acute angle of 5 degrees with the longitudinal axis of mandrel 2.

In operation, a plurality of rolls 9 are mounted in the tension bearings 19 in the positioner 10. The leading edge of each continuous sheet 1 from the rolls 9 is fed between the mandrel 2 and the lower rollers 3 so that the adjacent edges of the continuous sheets 1 abut each other in contiguous relationship and so that the longitudinal axis and the contiguous edges 8 of all of the continuous sheets 1 are equally offset at an angle of ½ to 10 degrees from a plane perpendicular to the longitudinal axis of the mandrel 12. The angle at which the edges 8 are offset is determined by the desired characteristics of the finished pipe. As the angle of offset increases, the length of the finished pipe decreases. As the angle of offset decreases below about 1 degree, both flexural and burst tensile strength values begin to decrease. The mandrel 2 is rotated by frictional engagement with the rotating rollers 3 and 4 and the continuous sheets 1 are wrapped around the mandrel 2 in successive layers until the desired wall thickness of pipe has been reached. The pressure on the mandrel 2 and therefor sheets 1 is regulated by pressure roller 4. As the continuous sheets 1 are wrapped around the mandrel 2, the adjacent continuous sheets 1 are joined together by the spiral joints 14 formed by the adjacent contiguous edges 8. The joints 14 are strengthened in that any one point of the joint is reinforced by several layers of the laminated paper. The positioner 10 is automatically moved along the track 11 on the rollers 22 by the pull of the sheets 1 as the spiral joint is being formed and the tension bearings 19 maintain an even tension on the paper during the formation of the pipe and the movement of the positioner. Thus, the instant invention provides a process and apparatus for forming any desired length of reinforced plastic pipe from a plurality of rolls supplying continuous sheets of resin saturated paper having a width substantially less than the length of the finished pipe and having only a relatively small number of spaced spiral joints in its overall length and which has uniformly smooth inner and outer surfaces.

*Example 1.*—In one series of operations, a plurality of reinforced plastic pipes were fabricated from two rolls of resin impregnated paper in which each of the rolls supplied a continuous sheet of paper 20 inches in width. The rolls were placed on the positioner so that their free longitudinal edges were offset at an angle of ½ degree to the mandrel on which the pipe was fabricated. The mandrel was rotated to have a peripheral speed of approximately 2 inches per second and was subjected to a pressure of 100 lbs. per lineal inch during the fabrication of the pipe. Each reinforced plastic pipe fabricated under the above conditions had the following average characteristics: length 37½ inches; internal diameter, 2⅛ inches; wall thickness .090 inch; a burst strength of approximately 1300 lbs. per square inch; and flexural strength on a 15 inch span of 11,250 lbs. per square inch.

*Example 2.*—In another series of operations, a plurality of reinforced plastic pipes were fabricated from two rolls of resin impregnated paper in which each of the rolls supplied a continuous sheet of paper 20 inches in width. The rolls were placed on the positioner so that their free longitudinal edges were offset at an angle of 1 degree to the mandrel on which the pipe was fabricated. The mandrel was rotated to have a peripheral speed of approximately 2 inches per second and was subjected to a pressure of 100 lbs. per lineal inch during the fabrication of the pipe. Each reinforced plastic pipe fabricated under the above conditions had the following average characteristics: length 36 inches; internal diameter 2⅛ inches; wall thickness .084 inch; a burst strength of approximately 1300 lbs. per square inch; and a flexural strength on a 15 inch span of 15,000 lbs. per square inch.

*Example 3.*—In another series of operations, a plurality of reinforced plastic pipes were fabricated from two rolls of resin impregnated paper in which each of the rolls supplied a continuous sheet of paper 20 inches in width. The rolls were placed on the positioner so that their free longitudinal edges were offset at an angle of 4 degrees to the mandrel on which the pipe was fabricated. The mandrel was rotated to have a peripheral speed of approximately 2 inches per second and was subjected to a pressure of 100 lbs. per lineal inch during the fabrication of the pipe. Each reinforced plastic pipe fabricated under the above conditions had the following average characteristics: length 31 inches; internal diameter 2⅛ inches; wall thickness .086 inch; a burst strength of approximately 1500 lbs. per square inch and a flexural strength on a 15 inch span of 14,000 lbs. per square inch.

In the examples given above, the paper in the rolls was an asbestos paper 12 mils thick having a dry tensile strength of 8 lbs. per inch in a direction along the length of the paper and was saturated with an epoxy resin so that the resin content of the finished paper was approximately 55%. After being formed on a mandrel, each pipe was cured for two hours at a temperature of 250° F.

The examples given above are for illustration purposes only, and it is not intended to limit the invention thereto.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. A method for making a hollow tubular article comprising:
    (a) positioning a plurality of sheets, each of which has a longitudinal axis and at least two free edges substantially parallel to its said longitudinal axis, so that the adjacent longitudinal edges of said sheets may be arranged in substantially abutting relationship,
    (b) feeding said sheets to a mandrel for wrapping thereon with the free edges and the longitudinal axis of each sheet arranged to form an acute angle with a plane perpendicular to the longitudinal axis of said mandrel and for wrapping thereon with said adjacent edges in substantially abutting relationship, and
    (c) wrapping each of said sheets, so arranged, upon itself around said mandrel for at least two complete revolutions to form a plurality of hollow tubular articles each having at least two laminations of one of said sheets,
    (d) the said wrapping of each of said sheets at said acute angle forming, by the cooperation between the adjacent abutting edges of said sheets and the plurality of laminations, a spiral joint uniting adjacent hollow tubular articles into one hollow tubular article having a longitudinal length substantially greater than the width of any one of said sheets.

2. A method for making a plastic pipe comprising:
    (a) positioning a plurality of continuous sheets of resin impregnated paper, each of which has a longitudinal axis and at least two free edges substantially parallel to its said longitudinal axis, so that the adjacent longitudinal edges of said continuous sheets may be arranged in substantially abutting relationship,
    (b) feeding said sheets to a mandrel for wrapping thereon with the free edges and the longitudinal axis of each sheet arranged to form an acute angle with a plane perpendicular to the longitudinal axis of said mandrel and for wrapping thereon with the said adjacent edges in substantially abutting relationship, and
    (c) wrapping each of said sheets, so arranged, upon itself around said mandrel for at least two complete revolutions to form a plurality of plastic pipes each having at least two laminations of one of said sheets,
    (d) the said wrapping of each of said sheets at said acute angle forming, by the cooperation between the adjacent abutting edges of said sheets and the plurality of laminations, a spiral joint uniting adjacent plastic pipes into one plastic pipe having a longitudinal length substantially greater than the width of any one of said continuous sheets.

3. A method for making a hollow tubular article comprising:
    (a) positioning a plurality of sheets, each of which has a longitudinal axis and at least two free edges substantially parallel to its said longitudinal axis, so that the adjacent longitudinal edges of said sheets may be arranged in substantially abutting relationship,
    (b) feeding said sheets to a rotating mandrel for wrapping thereon with the free edges and the longitudinal axis of each sheet arranged to form an acute angle of ½ to 10 degrees with a plane perpendicular to the longitudinal axis of said mandrel and for wrapping thereon with said adjacent edges in substantially abutting relationship, and
    (c) wrapping each of said sheets, so arranged, in a continuous operation around said mandrel upon itself for at least two complete revolutions to form a plurality of hollow tubular articles each having at least two laminations of one of said sheets,
    (d) the said wrapping of each of said sheets at said angle forming, by the cooperation between the adjacent abutting edges of said sheets and the plurality of laminations, a spiral joint uniting adjacent hollow tubular articles on said mandrel in the form of a hollow tubular article having a longitudinal length substantially exceeding the width of each individual sheet.

4. A method for making a plastic pipe on a mandrel positioned between a pair of driven rollers and a pressure roller comprising:
    (a) positioning a plurality of continuous sheets of resin impregnated paper, each of which has a longitudinal axis and at least two free edges substantially parallel to its said longitudinal axis, so that the adjacent longitudinal edges of said continuous sheets may be arranged in substantially abutting relationship,
    (b) feeding said sheets to said mandrel for wrapping thereon with the free edges and the longitudinal axis of each sheet arranged to form an acute angle with a plane perpendicular to the longitudinal axis of said mandrel and for wrapping thereon with said adjacent edges in substantially abutting relationship,
    (c) applying a positive pressure on said mandrel through said pressure roller,
    (d) introducing the leading edge of each of said sheets between said mandrel and said pressure roller,
    (e) wrapping each of said sheets, so arranged, upon itself around said mandrel for at least two complete revolutions under said positive pressure to form a plurality of plastic pipes each having at least two laminations of one of said sheets,
    (f) the said wrapping of said sheets at said angle forming, by the cooperation between the adjacent abutting edges of said sheets and the plurality of laminations, a spiral joint uniting adjacent plastic pipes in the form of a plastic pipe having a longitudinal length substantially greater than the width of any one of said sheets, and
    (g) severing said continuous sheets adjacent said mandrel when a pipe having predetermined wall thickness has been formed.

References Cited in the file of this patent

UNITED STATES PATENTS

| | | |
|---|---|---|
| 414,649 | MacFarlane | Nov. 5, 1889 |
| 679,264 | Pedley | July 23, 1901 |
| 2,321,738 | Farny | June 15, 1943 |
| 2,322,677 | Walt et al. | June 22, 1943 |
| 2,716,315 | Jacoby | Aug. 30, 1955 |
| 2,786,435 | Ellzey | Mar. 26, 1957 |
| 2,876,739 | Gauthier | Mar. 10, 1959 |

FOREIGN PATENTS

| | | |
|---|---|---|
| 296,896 | Italy | May 30, 1932 |
| 564,929 | France | Jan. 15, 1924 |